US 12,053,867 B2

(12) United States Patent
Lee et al.

(10) Patent No.: US 12,053,867 B2
(45) Date of Patent: Aug. 6, 2024

(54) HYDRAULIC TENSIONING APPARATUS

(71) Applicant: Tentec Limited, Wolverhampton (GB)

(72) Inventors: Adam Thomas Lee, Dudley (GB); Anthony Scrivens, Telford (GB)

(73) Assignee: Tentec Limited, Wolverhampton (GB)

( * ) Notice: Subject to any disclaimer, the term of this patent is extended or adjusted under 35 U.S.C. 154(b) by 487 days.

(21) Appl. No.: 17/312,917

(22) PCT Filed: Dec. 11, 2019

(86) PCT No.: PCT/GB2019/053507
§ 371 (c)(1),
(2) Date: Jun. 10, 2021

(87) PCT Pub. No.: WO2020/120959
PCT Pub. Date: Jun. 18, 2020

(65) Prior Publication Data
US 2022/0032434 A1 Feb. 3, 2022

(30) Foreign Application Priority Data
Dec. 11, 2018 (GB) ..................................... 1820138

(51) Int. Cl.
*B25B 29/02* (2006.01)
*B23P 19/06* (2006.01)
*F15B 21/02* (2006.01)

(52) U.S. Cl.
CPC ............ *B25B 29/02* (2013.01); *B23P 19/067* (2013.01); *F15B 21/02* (2013.01); *F15B 2211/565* (2013.01)

(58) Field of Classification Search
CPC ......... B25B 23/04; B25B 23/14; B25B 29/00; B25B 29/02; B23P 19/04; B23P 19/06;
(Continued)

(56) References Cited

U.S. PATENT DOCUMENTS 4,815,344 A * 3/1989 Nemec .................... B25B 23/14
976/DIG. 175
7,062,998 B2 * 6/2006 Hohmann ............... B25B 29/02
81/55
(Continued)

FOREIGN PATENT DOCUMENTS

CN 104002278 A 8/2014
DE 20 2013 010 307 U1 1/2014
(Continued)

OTHER PUBLICATIONS

International Search Report and Written Opinion, PCT/GB2019/053508, mailed Mar. 16, 2020.
Search Report, GB1820138.4, Mailed May 3, 2019.

*Primary Examiner* — Robert J Scruggs
(74) *Attorney, Agent, or Firm* — Wiggin and Dana LLP

(57) ABSTRACT

A hydraulic tensioning apparatus for tensioning a threaded member (2) having a thread, comprising: a hydraulic tensioner (1), having a body (4) and a pressure space (13) for hydraulic fluid and having a thread engaging member (7) arranged to engage the thread of the threaded member (2) and to be urged away from the body (4) on introduction of hydraulic fluid into the pressure space (13) so as to tension the threaded member (2); a displacement sensor (11, 12) arranged to measure a linear displacement of the thread engaging member (7) relative to the base (4) and to provide an output indicative of the linear displacement; a rotation sensor (65, 66) arranged to determine a rotation of a nut (3) rotating on the threaded member (2) and arranged to produce output indicative of a rotation angle of the nut (3); and a control unit (80) arranged to take as inputs the outputs of the displacement sensor (11, 12) and the rotation sensor (65, 66), and to determine from the output of the displacement sensor (11, 12) a required angle of rotation of the nut (3) which
(Continued)

accommodates for extension of the threaded member (2) due to being tensioned by the hydraulic tensioner (1).

19 Claims, 6 Drawing Sheets

(58) Field of Classification Search
CPC ...... B23P 19/002; B23P 19/067; F15B 20/00; F15B 21/02; F15B 2211/528; F15B 2211/565
See application file for complete search history.

(56) References Cited

U.S. PATENT DOCUMENTS

| | | |
|---|---|---|
| 9,229,232 B2 | 1/2016 | Backhaus |
| 2004/0261583 A1 | 12/2004 | Hohmann et al. |
| 2013/0185932 A1 | 6/2013 | Imi |
| 2014/0000414 A1 | 1/2014 | Hohmann et al. |
| 2015/0314431 A1* | 11/2015 | Hohmann ............. B23P 19/067 81/57.38 |
| 2017/0334049 A1* | 11/2017 | Dumelow ............... B25B 29/02 |

FOREIGN PATENT DOCUMENTS

| | | | |
|---|---|---|---|
| GB | 1418508 A | 12/1975 | |
| GB | 2 412 705 A | 10/2005 | |
| GB | 2492140 A | 12/2012 | |
| JP | H10170362 A | 6/1998 | |
| JP | 2013022710 A | 2/2013 | |
| SU | 1069984 * | 1/1984 | |
| WO | 92/09087 | 5/1992 | |
| WO | WO-2008092768 A2 * | 8/2008 | ............ B23P 19/067 |
| WO | 2015/118283 A1 | 8/2015 | |
| WO | WO-2015118283 A1 * | 8/2015 | ............ B23P 19/067 |

\* cited by examiner

HYDRAULIC TENSIONING APPARATUS

Tensioners are commonly used for, amongst other tasks, stretching items such as bolts or studs, so that a threaded nut can then be run down the stretched bolt, thus capturing the tension in the stretched bolt. Typically, they are used in any field that requires large loads to be secured by the use of threaded fasteners; one common use is in wind turbines, when such tensioners can be used to secure many fastenings, such as the turbine blades to their bearing, or the tower of such a turbine to its foundations.

In our previous PCT patent application WO2015/118283, we discussed that it is desirable to know the elongation of the threaded member, particularly in situations where the traceability of the attachment of the nut on the threaded member is important, such as in the example of wind turbines discussed above. Whilst it is, to some extent, possible to calculate the elongation of the threaded member by using the pressure of the hydraulic fluid introduced into the pressure space in combination with the material dimensions and properties of the bolt, this is however not a particularly reliable measure. In that prior application, we discussed the provision of a linear displacement sensor which measured the extension of the workpiece.

Hydraulic tensioners are well known in the art; examples of the same can be seen in the European Patent Application published as EP 2 522 465 and in the Japanese Patent Application published as JP3-204406. Such tensioners can be used to stretch a threaded member such as a stud, bolt or the like, and generally comprise inner and outer coaxial generally cylindrical annular bodies which are placed around the threaded member. The inner body threadedly engages the threaded member. A space between the inner and outer bodies defines a pressure space, into which fluid, typically hydraulic fluid, can be introduced to drive the bodies apart along their common axis.

Operation of such tensioners requires a certain amount of skill and experience, especially to be able to reliably and repeatably tension an item to be stretched. It would be desirable to provide a tensioner which at least partially ameliorated the problems a user faces when tensioning items using prior art tensioners to provide a repeatable, reliable and traceable tensioning.

According to a first aspect of the invention, we provide a hydraulic tensioning apparatus for tensioning a threaded member having a thread, comprising:
- a hydraulic tensioner, having a body and a pressure space for hydraulic fluid and having a thread engaging member arranged engage the thread of the threaded member and to be urged away from the body on introduction of hydraulic fluid into the pressure space so as to tension the threaded member;
- a displacement sensor arranged to measure a linear displacement of the thread engaging member relative to the base and to provide an output indicative of the linear displacement;
- a rotation sensor arranged to determine a rotation of a nut rotating on the threaded member and arranged to produce an output indicative of a rotation angle of the nut; and
- a control unit arranged to take as inputs the outputs of the displacement sensor and the rotation sensor, and to determine from the output of the displacement sensor a required angle of rotation of the nut which accommodates for extension of the threaded member due to being tensioned by the hydraulic tensioner.

As such, by monitoring the displacement (and so threaded member extension), it can be determined how much the nut should be rotated to accommodate for the extension of the threaded member.

Typically, the control unit will also be arranged to compare a rotation of the nut indicated by the output of the rotation sensor with the required angle of rotation, so as to determine if the nut has been sufficiently rotated to accommodate for the extension of the threaded member.

The apparatus may be provided with a nut rotation indicator; the control unit may be arranged to provide an indication with the nut rotation indicator when it determines that the nut has been sufficiently rotated. The nut rotation indictor may be a binary indicator, in that it has only two states—that the target nut rotation has been reached and that it has not.

Thus, a user can be notified when the nut has been correctly rotated and so that it may be appropriate to release any pressure in the pressure space.

Typically, the apparatus will be provided with a pressure sensor arranged to determine the fluid pressure within the pressure space and to provide an output indicative of the pressure. The control unit may be provided with an input for a desired threaded member loading, such as a threaded member load factor. The control unit may be arranged so as to determine a target pressure based upon the desired threaded member loading. The control unit may further be arranged to so as to compare the pressure as indicated by the output of the pressure sensor with the target pressure to make a determination whether the target pressure has been reached. The control unit may be arranged such that it only determines that the target pressure has been reached if the pressure indicated by the output of the pressure sensor is at least the target pressure and that a rate of decrease of the pressure indicated by the output of the pressure sensor is less than a threshold.

The apparatus may also be provided with a target pressure indicator, with the control unit being arranged to provide an indication to a user with the target pressure indicator when it has determined that the target pressure has been reached. The target pressure indictor may be a binary indicator, in that it has only two states—that the target pressure has been reached and that it has not.

Thus, a user can be notified when the correct pressure has been safely reached and so that the nut can then be rotated to capture the tension in the threaded member. Additionally, the apparatus may be provided with a target pressure value indicator, which may indicate the target pressure, typically numerically.

The control unit may be arranged to compare the displacement indicated by the output of the displacement sensor after pressure in the pressure space has been released with a desired or predetermined residual displacement.

The rotation sensor may directly sense rotation of the nut. Alternatively, the apparatus may comprise a gearbox having an output arranged to drive the nut and an input for being driven by a driving means (typically user operated), with the rotation sensor sensing rotation of a part of the gearbox, typically a gear coupled directly to the input of the gearbox.

The apparatus may further comprise a torque sensor, arranged to measure a torque applied to the nut. Whilst the torque sensor may directly measure the torque applied to the nut, the torque sensor will typically measure the torque applied to part of the gearbox, typically the input, and may calculate the torque at the nut via the gearbox reduction ratio.

The apparatus may be provided with storage coupled to the control unit, whereby the control unit can store in the storage values of the pressure, rotation and displacement indicated by the outputs of the pressure sensor, the rotation sensor and the displacement sensor respectively. This aids in traceability. It may also store in the storage values of the torque indicated by the outputs of the torque sensor.

According to a second aspect of the invention, we provide a method of tensioning a threaded member having a thread on which there is a load-retaining nut, comprising:

engaging the thread of the threaded member with a thread-engaging member of a hydraulic tensioner, the hydraulic tensioner having a body and a pressure space for hydraulic fluid, the thread engaging member being arranged to be urged away from the body on introduction of hydraulic fluid into the pressure space so as to tension the threaded member;

measuring a linear displacement of the thread engaging member relative to the base using a displacement sensor;

measuring a rotation angle of the nut using a rotation sensor; and determining from the displacement a required angle of rotation of the nut which accommodates for extension of the threaded member due to being tensioned by the hydraulic tensioner.

As such, by monitoring the displacement (and so threaded member extension), it can be determined how much the nut should be rotated to accommodate for the extension of the threaded member.

The method may also comprise comparing a rotation of the nut indicated by the output of the rotation sensor with the required angle of rotation, so as to determine if the nut has been sufficiently rotated to accommodate for the extension of the threaded member.

The method may comprise providing a nut rotation indication when it has been determined that the nut has been sufficiently rotated. The nut rotation indication may be binary, in that it has only two states—that the target nut rotation has been reached and that it has not.

Thus, a user can be notified when the nut has been correctly rotated and so that it may be appropriate to release any pressure in the pressure space.

The method may comprise determining, using a pressure sensor, a fluid pressure within the pressure space.

The method may also comprise determining a target pressure based upon a desired threaded member loading. The method may comprise comparing the fluid pressure with the target pressure to make a determination whether the target pressure has been reached. The method may comprise determining that the target pressure has been reached only if the pressure indicated by the output of the pressure sensor is at least the target pressure and if a rate of decrease of the pressure indicated by the output of the pressure sensor is less than a threshold.

The method may also comprise providing a target pressure indication that it has been determined that the target pressure has been reached. The target pressure indication may be binary, in that it has only two states—that the target pressure has been reached and that it has not.

Thus, a user can be notified when the correct pressure has been safely reached and so that the nut can then be rotated to capture the tension in the threaded member. Additionally, the method may comprise indicating the target pressure, typically numerically.

The method may comprise comparing the linear displacement once the pressure in the pressure space has been released with a desired or predetermined residual displacement.

The method may comprise storing values of the pressure, rotation and linear displacement in storage. This aids in traceability. The method may also comprise storing in the storage values of the torque.

There now follow, by way of example only, description of embodiments of the invention, described with reference to the accompanying drawings, in which.

Figure 1:
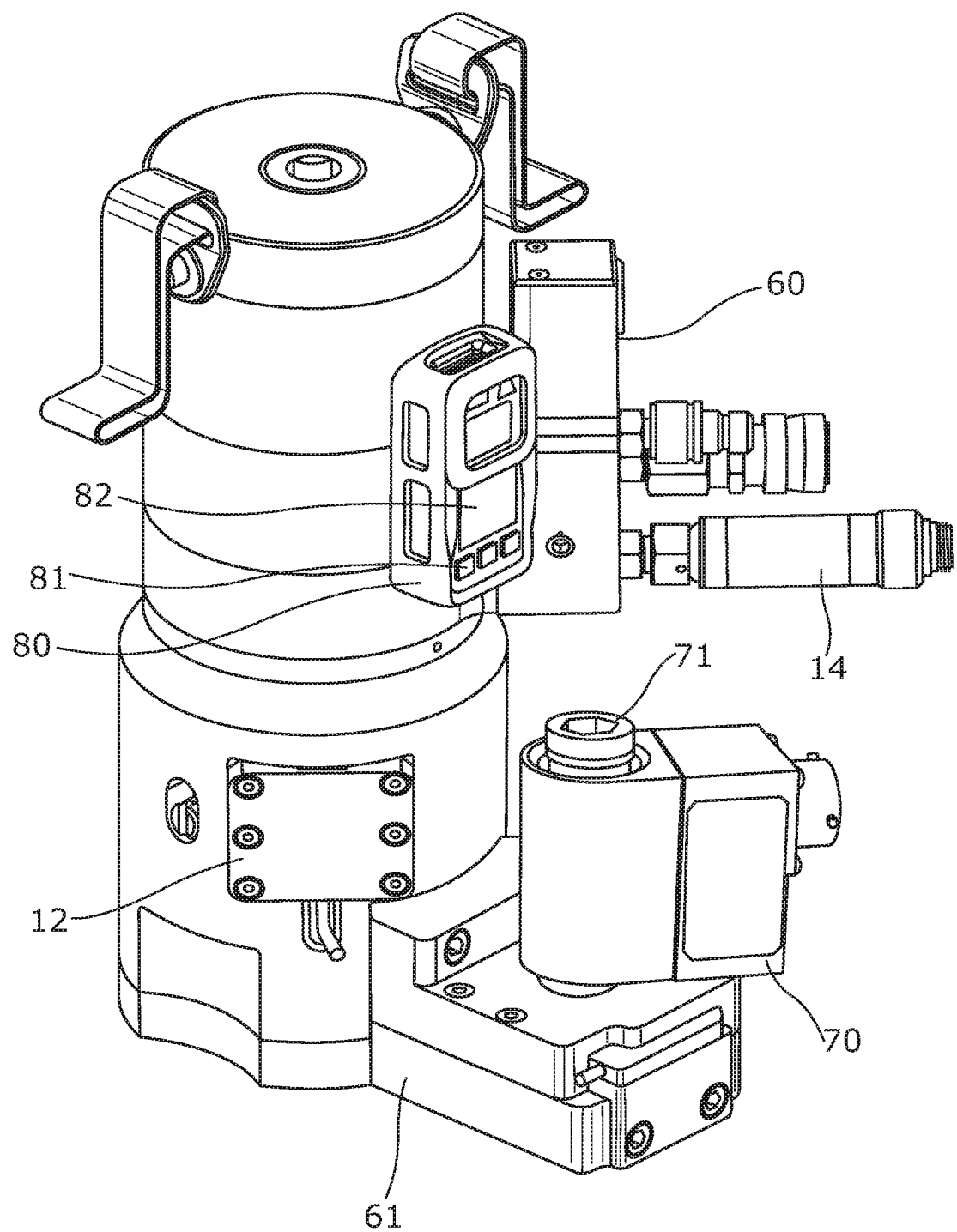
FIG. 1 shows a perspective view of a hydraulic tensioner in accordance with an embodiment of the invention.
Figure 2:
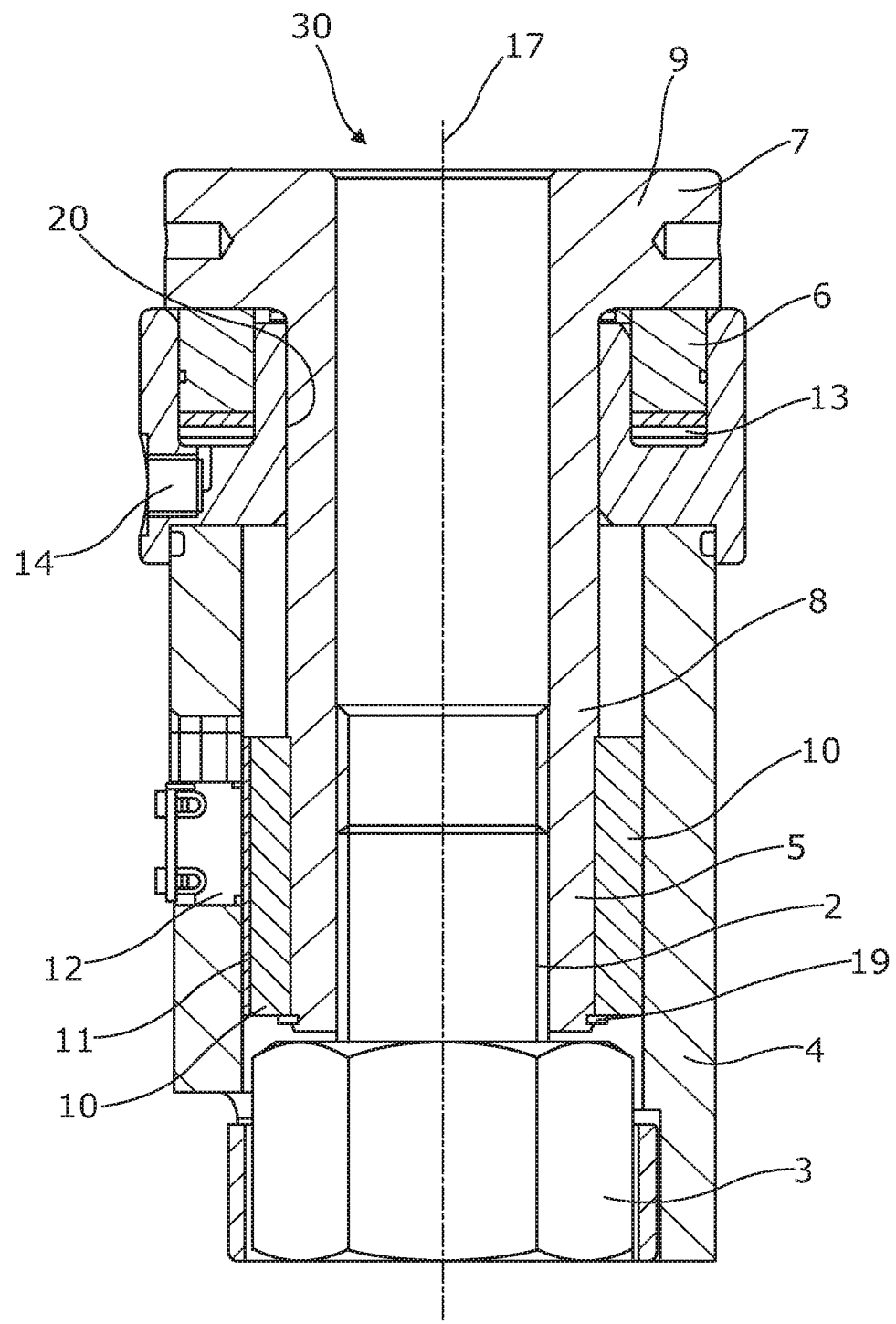
FIG. 2 shows a cross-section through the tensioner of FIG. 1.

A hydraulic tensioner 1 in accordance with an embodiment of the invention is shown in the accompanying drawings. The tensioner can act to tension and so extend a threaded member of the form of a bolt or stud 2; a nut 3 can then be run down the bolt 2 in order to capture that tension.

The tensioner comprises a base 4, which forms a housing for the tensioner and will rest against a fixed surface. The tensioner also comprises a piston 6, which can move relative to base 4 along central axis 17 through a bore 20.

Between the base 4 and the piston 6 there is defined a pressure space 13. Hydraulic fluid can be introduced into this space by means of a system of ports 14. By doing so, the piston 6 can be forced away from the base 4; the piston 6 will move along axis 17, vertically in the sense of the Figures.

The piston 6 has a central through bore 20, coaxial with the axis 17. In this bore 20 there is provided a thread-engaging member 7. This thread-engaging member 7 comprises a body portion 8 of the form of a cylindrical sleeve that fits within the bore 20. The interior of the sleeve defines a threaded bore 30, which engages the threaded member 2.

The thread-engaging member 7 has a piston engaging portion 9 positioned at the end of the body portion 8. It forms a protrusion of the form of a flange, which abuts the piston 6 such that the force generated by the piston 6 being urged away from the base 4 is transmitted to the piston engaging portion 9, through body portion 8 and then through the threaded bore 20 to the threaded member 2. The nut 3 can then be run down threaded member 2 to keep the member 2 in tension and cause the nut 3 to press against the fixed surface once the tension due to the fluid in the pressure space 13 has been released.

However, it is desirable to be able to measure the elongation of the threaded member 2. In order to be able to do so, a sleeve 10 is provided around the external surface 5 of the body portion 8 of the thread-engaging member 7. The sleeve 10 is of the form of a cylindrical shell, coaxial with the axis 17. It is free to rotate relative to the thread-engaging member 7, but is retained against linear movement along the axis 17 by a retaining ring 27 protruding from the outer surface 5.

This sleeve 10 carries a magnetic encoder strip 11 along its length, mounted in a recess 21 in the outer surface of the sleeve 10. The magnetic encoder is of the form of a pattern of magnetic poles, so that a pattern of magnetic fields projection axially outwards from the sleeve 10 is created. The length of the magnetic encoder 11 is aligned parallel to the axis 17.

These magnetic fields can be read by a magnetic sensor 12 mounted in the base 4, which will typically be a Hall Effect sensor. The magnetic sensor 12 is fixed relative to the base 4 by means of clamps 18. As the threaded member 2 is extended, the magnetic encoder 11 will move past the magnetic sensor 12; by appropriate processing of the output of the sensor 12 it will be possible to measure the movement of the thread-engaging member 7 relative to the base 4 and from that determine the elongation of the threaded member 2. In the simplest case, the measurement can involve simple counting of the reversals of the magnetic field as poles past, but the skilled man will appreciate that there are multiple ways in which position can be encoded magnetically.

Because the encoder is mounted low down on the body 8 of the thread-engaging member 7, fewer errors are introduced into the measurement due to the elastic elongation of parts of the tensioner 1 such as the thread-engaging member. It can be seen that the magnetic encoder 11 is fitted on a portion of the body portion 8 that is engaging the threaded member, and so by measuring at that point these errors can be minimised.

In many ways, the embodiment described thus far is similar to that described in our earlier PCT application published as WO2015/118283, and reference is made to that publication for further reference as to the function of the linear displacement sensor.

Figure 3:
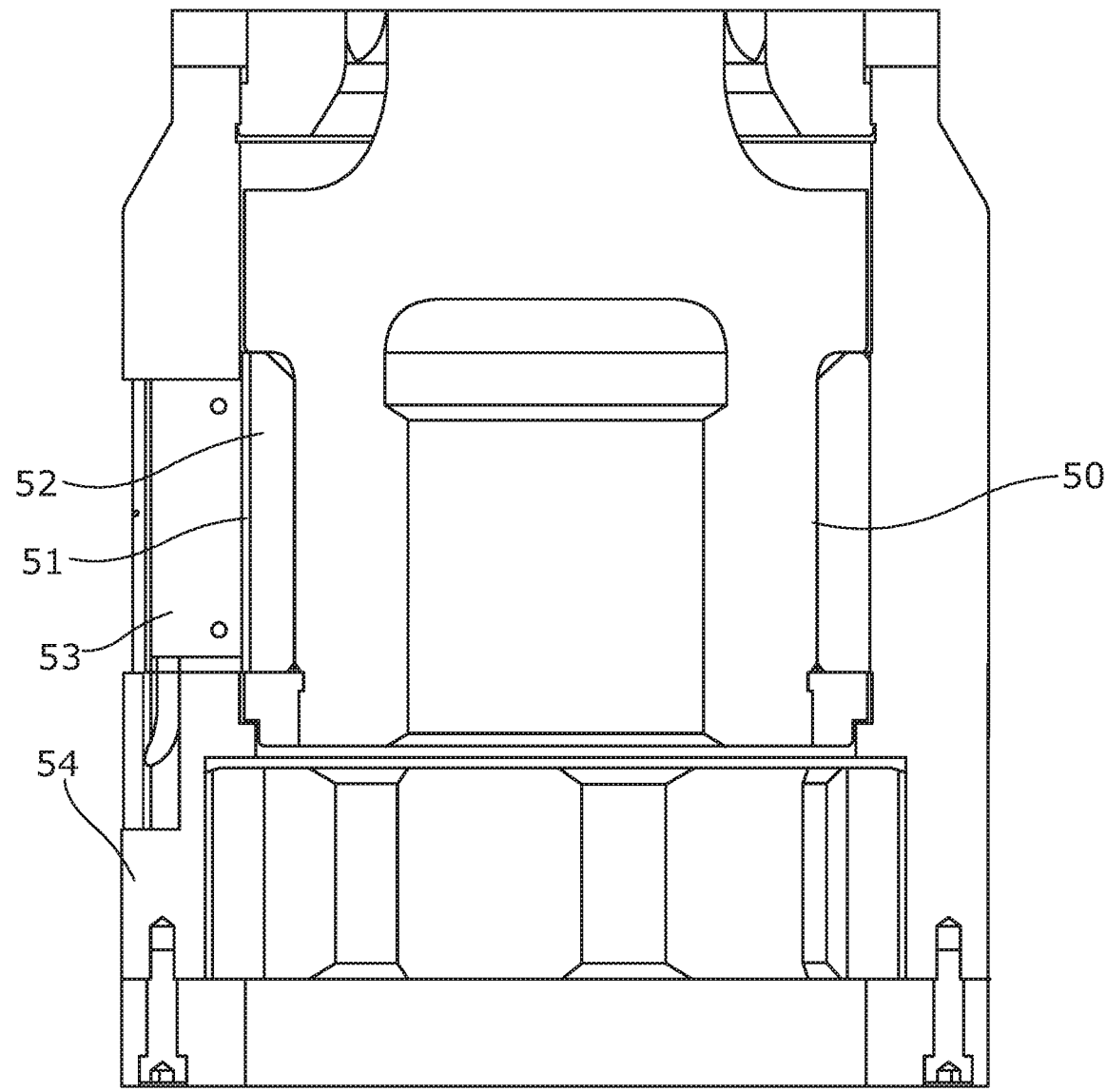
FIG. 3 shows a cross-section through an alternative tensioner in accordance with a further embodiment of the invention.

Alternatively, the tensioner could be a puller-bar type tensioner as shown in FIG. 3 of the accompanying drawings, where a puller bar 50 engages a stud (not shown) and a strip of magnetic encoding material 51 on a sleeve 52 moving with the puller bar 50 (in the same manner as sleeve 10 moves with thread-engaging member 7 and carries magnetic encoder 11) is sensed by a magnetic field sensor 53 fixed to a base 54 of the tensioner as the movement of the piston moves the puller bar 50 (and so the stud) relative to the base 54.

In addition, the hydraulic tensioner comprises various other sensors which are of use as described below.

A pressure sensor 60 is provided which measures the pressure of the fluid introduced into the pressure space 13.

Figure 4:
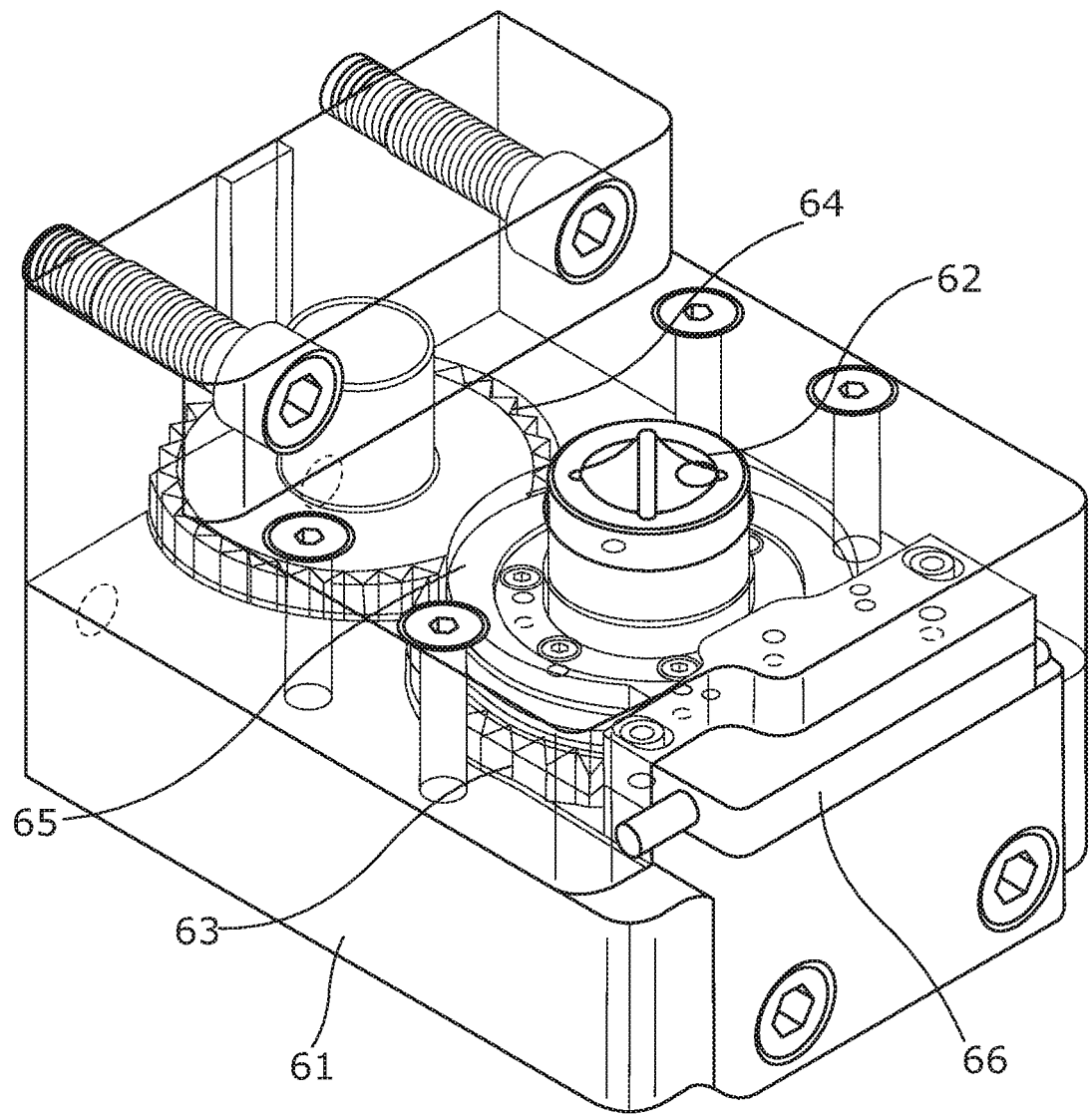
FIG. 4 shows the gearbox of the tensioner of FIG. 1.

A gearbox 61 is provided, shown in more detail in FIG. 4 of the accompanying drawings, which has an input 62 (of the form of a square ratchet drive socket) coupled to an input gear 63. Input gear 63 is coupled to output gear 64, which is arranged to rotate the nut 3. The input gear 63 carries a magnetic rotatory encoder 65, which passes magnetic sensor 66. As such, the magnetic sensor 66 provides an output which is indicative of the angle through which the nut 3 has been turned.

A torque sensor 70 is provided coupled to the input 62 of the gearbox 61. This provides a measurement of the torque applied to its input 71, which is also a square ratchet drive input. Thus, a user can apply a square ratchet drive to the input 71, which will transmit the torque and rotation applied by a user to the gearbox 61 (measuring the torque applied), which will in turn apply that torque and rotation to the nut 3 (measuring the rotation applied).

A control circuit 80 takes the output of all the above-mentioned sensors 12, 60, 66, 71 and processes them as set out below. Whilst in FIG. 1 it is shown as a unit fixed to the tensioner with screen 82 and buttons 81, it could equally well be implemented using any general purpose or personal computer, in which case the displays could be on a display of that computer. The control unit will also comprise storage to store the values measured.

The collection of that data allows for improved traceability and repeatability of the tensioning of joints. By following the method set out below, the apparatus can provide feedback to a user rather than relying on guesswork.

Figure 5:
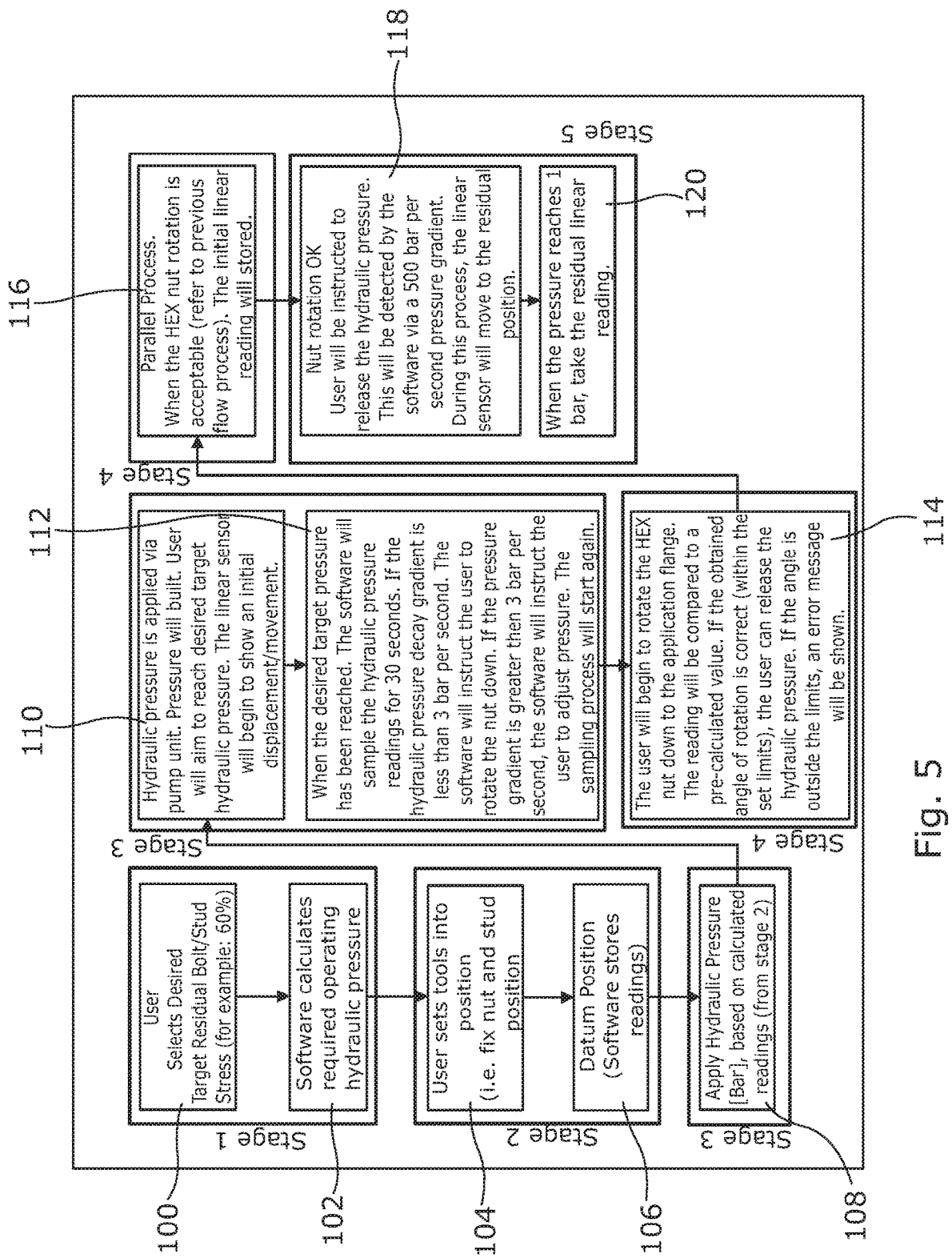
FIG. 5 shows a flow chart showing the operation of the tensioner of FIG. 1.
Figure 6:
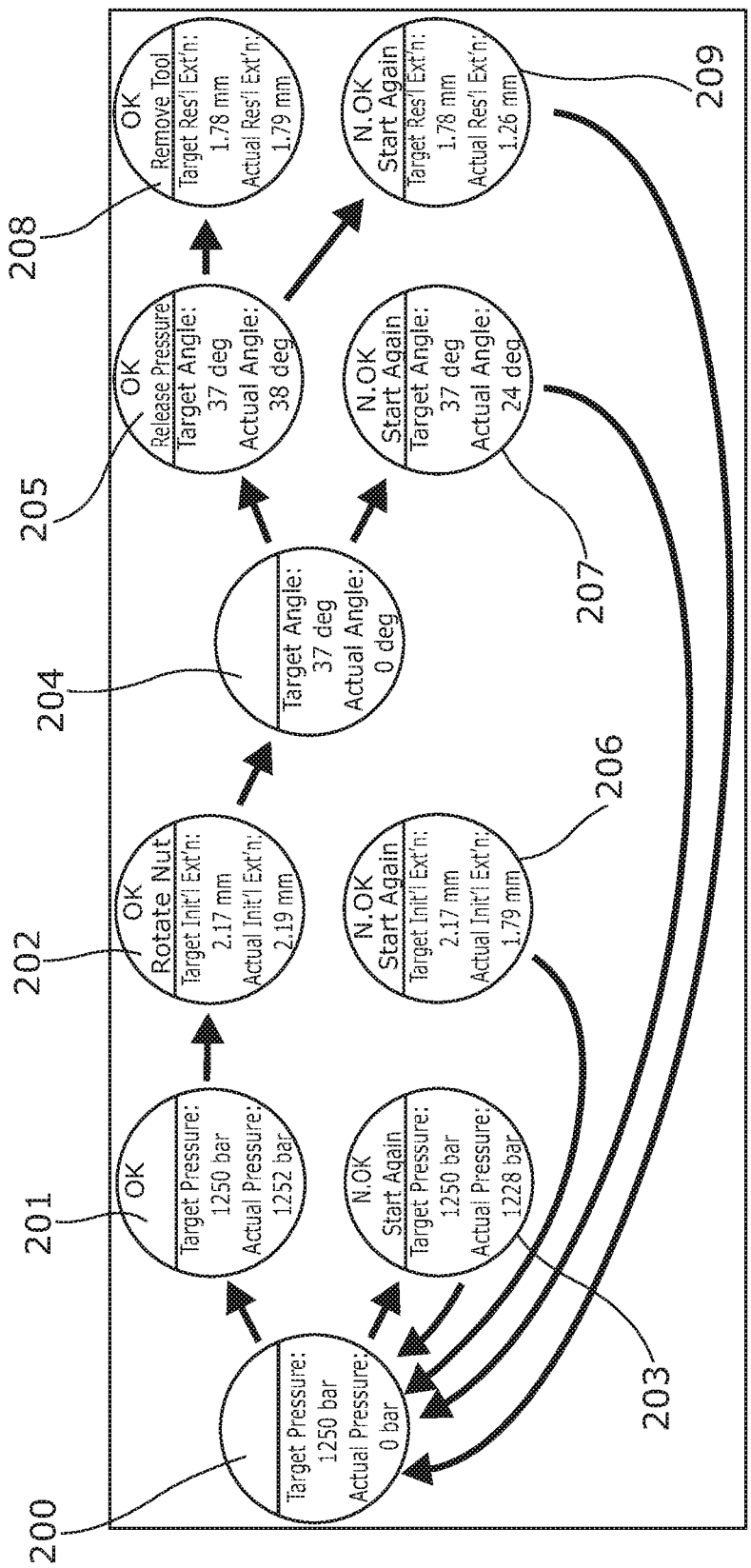
FIG. 6 shows the displays shown on the control unit of FIG. 1 as the operations of FIG. 5 are carried out.

FIG. 5 shows a flowchart of the method carried out by the control unit 80, and FIG. 6 shows sample displays shown on the screen 82.

In step 100, the user selects the desired bolt loading, for example by selecting a target residual bolt stress (in the example shown, 60%). In step 102, the control unit 80 calculates the required hydraulic pressure. This can be calculated using a lookup table for a particular tensioner. This is displayed on the screen 82 as shown at 200.

The user then fixes the tensioner into position relative to the stud 2 and nut 3 at step 104. At step 106, the control unit 80 records the values of pressure, linear displacement, rotation and torque and records those as nominal datum values.

The user then (at step 108) uses a source of hydraulic pressure to pressurise the pressure space 13. The pressure in the pressure space 13 will then build, and will be displayed on screen 82 along with the target pressure (step 110, display 201). If the hydraulic pressure reaches the target, and then decays at a limit of not more than 3 bar per second over 30 seconds, then the control unit determines that the target pressure has been stably reached (step 112). This determination is shown to the user in display 202 as an indication to rotate the nut 3 (display 202) together with the original calculated target extension and the extension which has been achieved (which are both stored in the storage at step 116); if the extension achieved is significantly less than predicted the user is advised to start again (display 206).

If the hydraulic pressure does not reach that target or decays faster than the limit, the user is advised to start again (display 203).

Assuming that the target pressure has been stably reached, the user rotates the nut 3 using the input 71 of the torque sensor 70 (step 114). The control unit 80 determines from the change in linear displacement measured by displacement sensor 12 and the pitch of the thread on the stud 2 the required rotational angle of the nut 3. This is displayed to the user in display 204.

Once the user reaches the target rotational angle (step 118), the user is instructed to release the hydraulic pressure (display 205); if the user does not achieved the expected rotation, the user is advised to start again at display 207. The pressure release is detected by the control unit 80 as a sharp decrease in pressure at above a threshold rate (e.g. 500 bar per second). Once this has occurred and the pressure has dropped to the original pressure (here, 1 bar), the residual extension as measured by the linear displacement sensor 12 is recorded in the storage (step 120) and displayed at display 208 and the user can remove the tensioner. However, if the actual residual extension is significantly less than expected, the user is advised to start again at display 209.

Because the user is advised step by step through the procedure and the various parameters are recorded, tensioning becomes much more traceable—because it is automatically recorded that each nut 3 has been rotated by the appropriate amount—and repeatable, because the control unit 80 automatically determines the correct rotation etc for the user rather than the user having to rely upon their experience or the same nominal rotation each time. Thus, the quality of tensioning can be increased.

The invention claimed is:

1. A hydraulic tensioning apparatus for tensioning a threaded member having a thread, comprising:
    a hydraulic tensioner, having a body and a pressure space for hydraulic fluid and having a thread engaging member arranged to engage the thread of the threaded member and to be urged away from the body on introduction of hydraulic fluid into the pressure space so as to tension the threaded member;
    a displacement sensor arranged to measure a linear displacement of the thread engaging member relative to the base and to provide an output indicative of the linear displacement;
    a rotation sensor arranged to determine a rotation of a nut rotating on the threaded member and arranged to produce an output indicative of a rotation angle of the nut; and
    a control unit arranged to take as inputs the outputs of the displacement sensor and the rotation sensor, and to determine from the output of the displacement sensor a required angle of rotation of the nut which accommodates for extension of the threaded member due to being tensioned by the hydraulic tensioner.

2. The apparatus of claim 1, in which the control unit is arranged to compare a rotation of the nut indicated by the output of the rotation sensor with the required angle of rotation, so as to determine if the nut has been sufficiently rotated to accommodate for the extension of the threaded member.

3. The apparatus of claim 2, provided with a nut rotation indicator, in which the control unit is arranged to provide an indication with the nut rotation indicator when it determines that the nut has been sufficiently rotated.

4. The apparatus of claim 1, provided with a pressure sensor arranged to determine the fluid pressure within the pressure space and to provide an output indicative of the pressure.

5. The apparatus of claim 4, in which the control unit is provided with an input for a desired threaded member loading, such as a threaded member load factor.

6. The apparatus of claim 5, in which the control unit is arranged so as to determine a target pressure based upon the desired threaded member loading.

7. The apparatus of claim 6, in which the control unit is arranged to so as to compare the pressure as indicated by the output of the pressure sensor with the target pressure to make a determination whether the target pressure has been reached.

8. The apparatus of claim 7, in which the control unit is arranged such that it only determines that the target pressure has been reached if the pressure indicated by the output of the pressure sensor is at least the target pressure and that a rate of decrease of the pressure indicated by the output of the pressure sensor is less than a threshold.

9. The apparatus of claim 7, provided with a target pressure indicator, with the control unit being arranged to provide an indication to a user with the target pressure indicator when it has determined that the target pressure has been reached.

10. The apparatus of claim 1, in which the control unit is arranged to compare the displacement indicated by the output of the displacement sensor after pressure in the pressure space has been released with a desired or predetermined residual displacement.

11. The apparatus of claim 1, in which the rotation sensor may directly sense rotation of the nut.

12. The apparatus of claim 1, comprising a gearbox having an output arranged to drive the nut and an input for being driven by a driving means, with the rotation sensor sensing rotation of a part of the gearbox, typically a gear coupled directly to the input of the gearbox.

13. The apparatus of claim 1, comprising a torque sensor, arranged to measure a torque applied to the nut.

14. A method of tensioning a threaded member having a thread on which there is a load-retaining nut, comprising:
    engaging the thread of the threaded member with a thread-engaging member of a hydraulic tensioner, the hydraulic tensioner having a body and a pressure space for hydraulic fluid, the thread engaging member being arranged to be urged away from the body on introduction of hydraulic fluid into the pressure space so as to tension the threaded member;
    measuring a linear displacement of the thread engaging member relative to the base using a displacement sensor;
    measuring a rotation angle of the nut using a rotation sensor; and
    determining, using a control unit, from the displacement a required angle of rotation of the nut which accommodates for extension of the threaded member due to being tensioned by the hydraulic tensioner.

15. The method of claim 14, comprising comparing a rotation of the nut indicated by the output of the rotation sensor with the required angle of rotation, so as to determine if the nut has been sufficiently rotated to accommodate for the extension of the threaded member.

16. The method of claim 14 or claim 15, comprising determining, using a pressure sensor, a fluid pressure within the pressure space, determining a target pressure based upon a desired threaded member loading and comparing the fluid pressure with the target pressure to make a determination whether the target pressure has been reached.

17. The method of claim 16, comprising determining that the target pressure has been reached only if the pressure indicated by the output of the pressure sensor is at least the target pressure and if a rate of decrease of the pressure indicated by the output of the pressure sensor is less than a threshold.

18. The method of claim 14, comprising comparing the linear displacement once the pressure in the pressure space has been released with a desired or predetermined residual displacement.

19. The method of claim 14, comprising storing values of the pressure, rotation, and linear displacement in storage.

* * * * *